Figure 1:
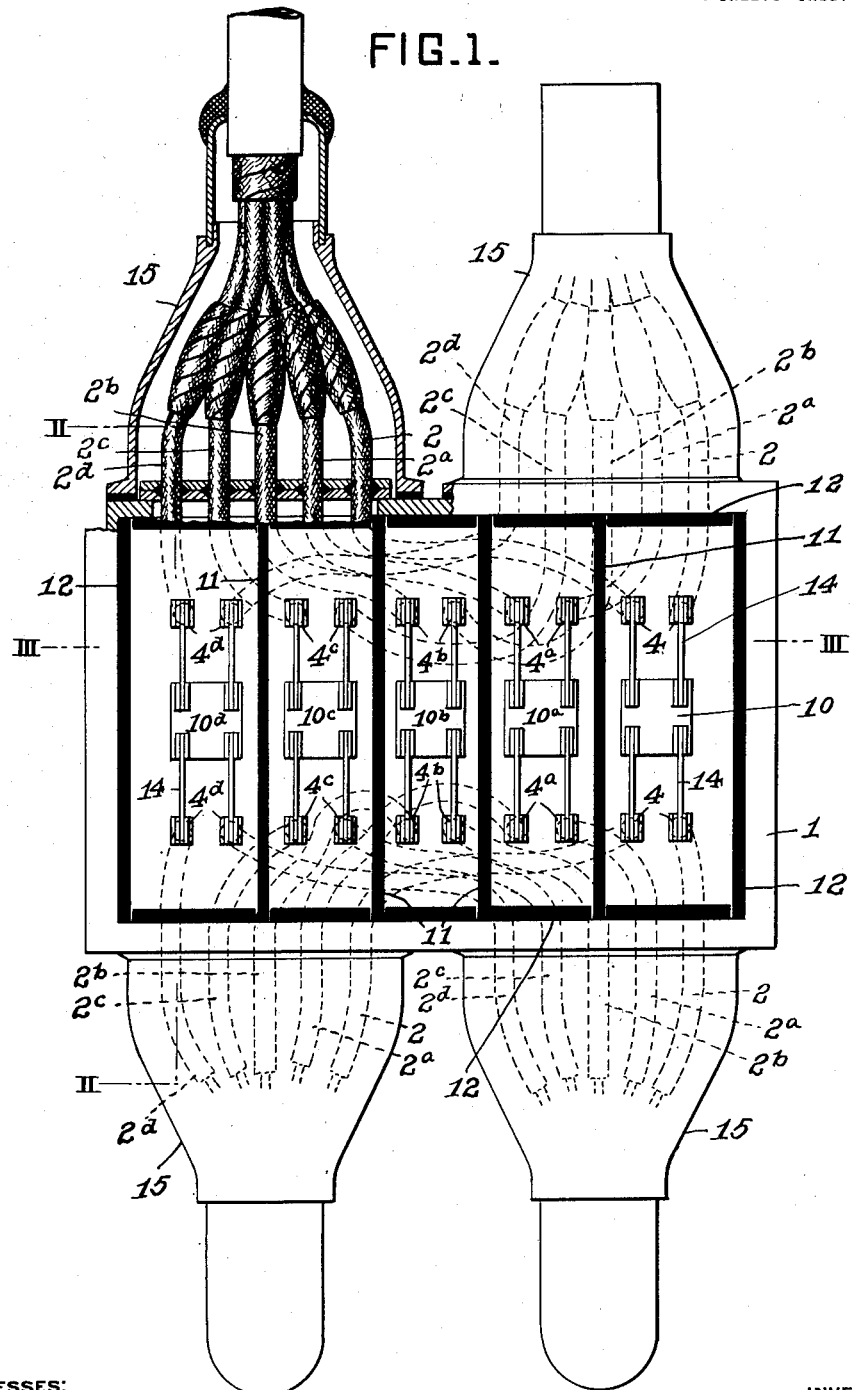

C. W. DAVIS.
JUNCTION BOX.
APPLICATION FILED JAN. 11, 1913.
1,176,739.
Patented Mar. 28, 1916.
2 SHEETS—SHEET 2.
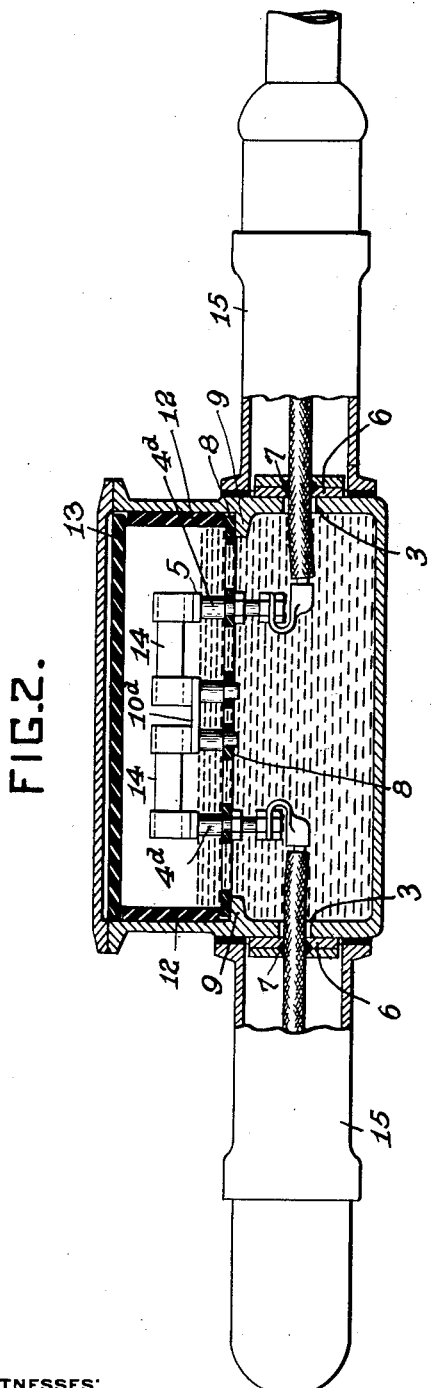
FIG.2.
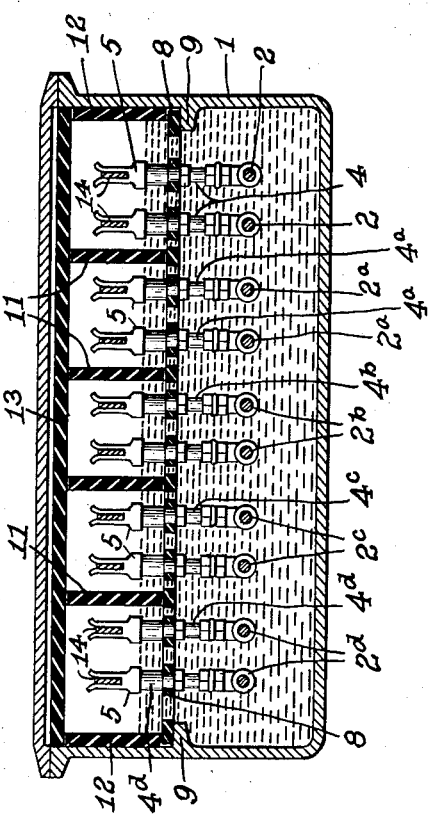
FIG.3.
WITNESSES:
INVENTOR
Charles W. Davis
by Christy & Christy
Atty's

UNITED STATES PATENT OFFICE.

CHARLES W. DAVIS, OF EDGEWORTH, PENNSYLVANIA, ASSIGNOR TO STANDARD UNDERGROUND CABLE COMPANY, OF PITTSBURGH, PENNSYLVANIA, A CORPORATION OF PENNSYLVANIA.

JUNCTION-BOX.

1,176,739.  Specification of Letters Patent.  Patented Mar. 28, 1916.

Application filed January 11. 1913. Serial No. 741.572.

*To all whom it may concern:*

Be it known that I, CHARLES W. DAVIS, residing at Edgeworth, in the county of Allegheny and State of Pennsylvania, a citizen of the United States, have invented or discovered certain new and useful Improvements in Junction-Boxes, of which improvements the following is a specification.

My present invention relates to junction boxes for electrical installations wherein a plurality of service electrical conductors are joined together for the purpose of equalizing or distributing the current carried thereby, and for the further purpose of connecting a feed line thereto when necessary or desirable.

The object of my invention is to increase the efficiency and reduce the size and cost of such boxes.

A further object of my invention is to provide a box which may be completely assembled for installation in a shop or other suitable place where working conditions are more favorable than in a man-hole where such boxes are usually employed. In this further object, my invention is similar to that described in my Patent No. 1,107,499, but differs in the specific means for obtaining such end.

In the accompanying drawings, which form part of my specification, Figure 1 is a plan view of a junction box illustrating an embodiment of my invention, the lid and insulation cover being removed in this view to show the interior construction and arrangement of the box; and Figs. 2 and 3 are sectional views thereof, taken on the lines II—II and III—III, respectively.

Like numerals are used in the several figures to designate like parts.

One feature of my invention consists in providing a junction box of the character and for the purpose described, wherein the several electrical conductors, including the distribution plates or bus-bars, are surrounded and supported by an insulation compound which is moldable when placed in the box casing, but which subsequently hardens and remains solid under all the heating conditions of service. This feature may be best understood by describing the manner of manufacturing such boxes. In the practice of this feature of my invention, I arrange the electrical conductors, which may consist of studs and leads connected thereto within a junction box casing in the desired relative position for the intended installation, and I support the conductors in such position in any desired manner, but preferably by means of a suitable frame or false-work. The lead ends of the conductors I extend through suitable orifices, preferably fluid-tight, in the junction box walls. After thus arranging the electrical conductors, I fill, to the desired depth, part of the portion of the casing containing the conductors with a hot insulating compound in a plastic or fluid state, which, when it cools and hardens, will be effective to hold, under all conditions of service, such conductors in their prearranged positions.

Referring now to the embodiment of my invention shown in the drawings, the side walls of the junction box casing 1 are provided with a plurality of orifices 3, through which flexible leads 2, 2ª, etc., extend, such leads terminating outside of the casing 1. Each lead 2, 2ª, etc., is connected to one end of a suitable stud or binding post 4, 4ª, etc., which is provided with a suitable fuse-bar yoke 5 at its opposite end; also each lead extends through a fluid-tight joint formed by two clamping plates 6 secured to the outside of the junction box wall, such clamping plates being adapted to compress a gasket 7 around the leads. The electrical conductors, consisting each of a stud 4 and lead 2, stud 4ª and lead 2ª, etc., are then suitably arranged and supported in their desired relative positions for service. The support for the electrical conductors may be a skeleton partition of wood 8, or any other suitable insulating material, such partition resting upon a suitably provided ledge 9 formed in the interior of the box; or the several electrical conductors may be suspended in any suitable manner from without the junction box. Also, distributing plates or bus bars 10, 10ª, etc., are suitably supported in desired positions in the same manner as said electrical conductors, the arrangement of such plates with relation to the yoke ends of said studs being such that suitable connecting members, such as the fuse bars 14, may be placed between them as desired. After such arranging and supporting of the conductors has been effected the casing is placed preferably in a horizontal position and a hot insulating compound, of the character described, is poured or otherwise molded therein until as much of the conductors is incased in the compound as is desired. When said conductors are supported by a frame 8, I preferably fill the box casing with insulating compound to such a depth that said frame is completely covered thereby, as shown in the drawings.

As stated above, the insulating compound which I employ is of such a character that when it cools it will harden and form a support for the several electrical conductors under all heating conditions of service. Insulating compounds having different physical characteristics may be employed for this purpose. For example, I find that the electrical conductors may be suitably molded within an insulating compound, which, when raised to a relatively high degree of temperature, becomes plastic; and among compounds of this character may be named the compound known as "electrose". However, I preferably employ a compound which will become fluid when raised to a relatively high degree of temperature. Such compounds are usually largely composed of asphaltum and tars. Some grades of the compound known as "ozite" contain relatively large percentages of asphaltum and tar, and are well adapted for use in junction boxes of the character described. In case it is desirable to have the exposed ends of said electrical conductors separated by walls 11 of insulating material, as porcelain plates, such plates may be arranged in the desired position before the compound is poured. The lower edges of these plates will preferably extend for a short distance into the compound. Also, in order to completely surround the exposed and bared ends of the conductors with walls of insulation the upper inner walls of the casing 1 may be suitably lined with plates 12 of insulating material, as shown, and a removable cover plate 13 of asbestos or porcelain may extend between such conductors and the removable lid.

It will be observed that when thus manufactured the completely insulated junction box has a minimum number of parts, and is therefore cheaper than boxes having more parts for supporting and connecting the electrical conductors. The box being filled with insulating compound at the manufacturing plant, all possible precautions may be taken to keep moisture from the conductors.

Another feature of my invention concerns the particular arrangement or grouping of electrical conductors of different potentials and phases, whereby the electrical conductors of like potential are grouped for current equalization in one part of the junction box. By such arrangement, like potential conductors may be placed closely together without the danger of arcing; and with the further advantage that the insulation walls, required between conductors of different and of high potentials, may for the most part be eliminated. Having reference now to the drawings, in order to illustrate this feature of my invention I have shown a junction box adapted to unite electrically the common potential conductors of four five-wire-twist cables. The leads are arranged in four groups of five each, and the studs are arranged in five groups of four each. One of each of the four groups of leads is connected to one of each of the five groups of studs. In connecting cables of the character described to the leads, the cable conductors of like potentials are connected to the leads extending to a single group of studs. As will be seen, a current distributing plate is arranged in suitable relationship to each group of studs to the end that suitable connections may be made between such plate and any one of the studs.

In order to show clearly the illustrative arrangement of the junction box parts, the leads in each of the several groups thereof are indicated by the numerals 2, $2^a$, $2^b$, $2^c$ and $2^d$; the studs bear the same reference exponent as the leads to which they are connected, that is, the studs 4 are connected to the leads 2, the studs $4^a$ to the leads $2^a$, etc.; the studs having like letter exponents form a single common-potential group; and the current equalization plate for each group bears the same letter exponent as the studs of such groups. As will be readily understood, the like potential studs of each group may be placed closely together without danger of arcing from one to the other. Partitions of insulating material 11 may separate each group of studs so that there will be no arcing between adjacently disposed studs of different potentials. Each group of electrical conductors or leads extending through the wall of the casing 1 may be inclosed, and thereby protected, within a supplemental casing 15 such as described in my heretofore mentioned application. In Fig. 1 of the drawings, one of such casings is shown in section, the leads inclosed thereby being connected to cable conductors of a lead sheath cable, which is secured to the outer end of the supplemental casing by means of a wiped soldered joint.

I claim as my invention:

1. As an article of manufacture, a junction box structure, comprising in combination a casing provided with a plurality of orifices in its walls, a plurality of electrical conductors arranged within said casing and extending through said orifices, current-distributing members arranged in positions to be electrically connected to said conductors, removable conducting elements for electrically connecting said members to said conductors, and a body of insulation placed around said conductors and said members, the removable conductors lying above the surface of said insulation, said insulation being moldable when placed in said casing but subsequently hardening and holding said conductors and said members in their arranged positions under all heating conditions of service.

2. As an article of manufacture, a junction box structure comprising in combination a casing provided with a plurality of orifices in its walls, a plurality of leads extending through said orifices and provided at their inner ends with studs, current-distributing members arranged in positions within said casing to be electrically connected to said studs, removable conducting elements for electrically connecting said members to said studs, and a body of insulation placed around said leads and around a portion of said studs and said distributing member, said removable connecting elements lying above the surface of said insulation, said insulation being moldable when placed in said casing but subsequently hardening and holding said leads, studs and distributing member in their prearranged positions under all heating conditions of service.

3. In an electrical installation the combination of a junction box, conductors of a plurality of multiple conductor cables entering said box, the cable conductors of a single cable carrying currents having different potentials but having the same potentials as cable conductors of another cable, a body of insulation within said box, a plurality of conducting studs mounted in said insulation and arranged in a plurality of separate groups, an equalizing conducting element mounted between the studs of each of said groups and adapted to be electrically connected thereto, said equalizing elements being separated from each other by the interval between adjacent groups of studs, and electrical connection means between the studs of a single group and the common potential cable conductors.

In testimony whereof I have hereunto set my hand.

CHARLES W. DAVIS.

Witnesses:
  ARTHUR A. ANDERSON,
  RALPH B. WILCOX.